United States Patent [19]

Scowen et al.

[11] 4,249,250
[45] Feb. 3, 1981

[54] COMPUTER STORAGE ARRANGEMENTS WITH OVERWRITE WARNING

[75] Inventors: Roger S. Scowen, Hampton; John L. Rodgers, Wokingham, both of England

[73] Assignee: National Research Development Corporation, London, England

[21] Appl. No.: 80,774

[22] Filed: Sep. 28, 1979

[30] Foreign Application Priority Data

Sep. 29, 1978 [GB] United Kingdom ............... 38634/78

[51] Int. Cl.³ ............................................... G11C 8/00
[52] U.S. Cl. ................................................ 365/230
[58] Field of Search ......................... 365/49, 189, 230

[56] References Cited

U.S. PATENT DOCUMENTS

| | | | |
|---|---|---|---|
| 4,095,283 | 6/1978 | Campbell et al. | 365/230 |
| 4,099,256 | 7/1978 | Draper | 365/230 |
| 4,168,541 | 9/1979 | Dekarske | 365/230 |

*Primary Examiner*—Stuart N. Hecker
*Attorney, Agent, or Firm*—Cushman, Darby & Cushman

[57] ABSTRACT

A computer store has a series of additional storage locations each associated with a main store address and each storing at least one digit. The additional locations have a "1" and a "0" written in when the associated address in the main store is written to and read from respectively. Before writing to the additional location its previous contents are read and fed to an AND gate together with the about to be written digit for that location. A "1" output from the AND gate, indicating an attempt to overwrite in the main store before its contents have been read, generates a warning or interrupt signal. At the end of a program block the corresponding block of additional storage locations can be read to determine whether any "1"s remain, thus indicating information in the main store written in during the program but unread.

7 Claims, 1 Drawing Figure

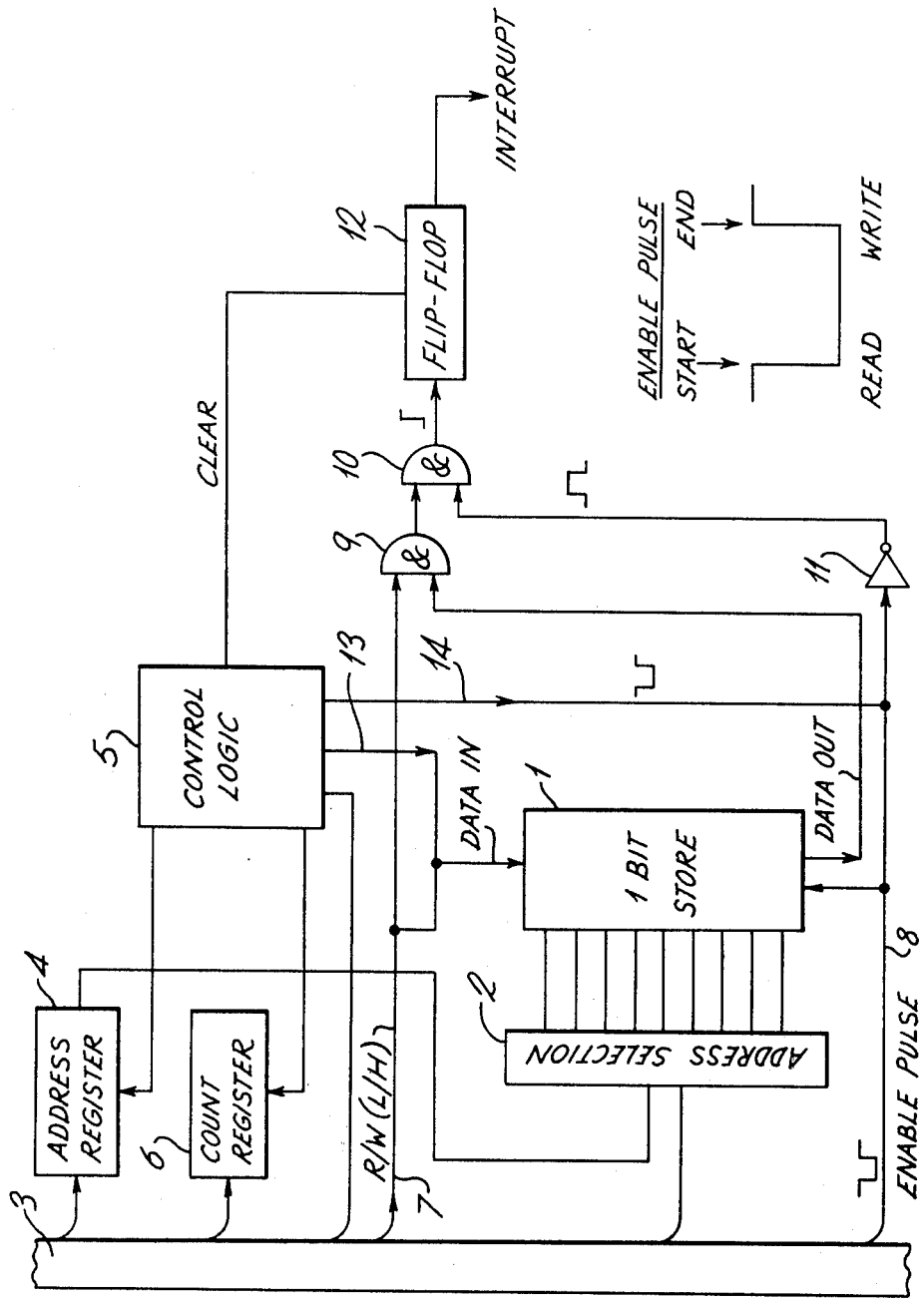

COMPUTER STORAGE ARRANGEMENTS WITH OVERWRITE WARNING

This invention realtes to computer storage arrangements.

A computer storage arrangement comprises a plurality of storage locations each designed to storage digital words of predetermined length. The storage locations are themselves numerically defined by what are termed their addresses.

A computer program involves the storage of words at selected addresses, termed writing, and the retrieval of the contents of selected addresses, termed reading. Thus in running a program there is a succession of writing and reading operations.

If in the course of a program a word is written to an address without the previous contents thereof having been read then in the large majority of cases the original assignment of a word to that address was superfluous and the program thus contains unncessary steps. Similarly if at the end of a program the contents of some of the storage locations have never been read then in all probability the original assignments to those storage locations were superfluous.

It is an object of the invention to provide a storage arrangement in which such superfluous assignments can be indicated.

According to the invention a computer storage arrangement comprises a main store for storing digital words at numerically defined storage locations wherein each storage location in the main store has associated therewith an additional storage location for storing at least a single binary digit, means for writing a binary digit of one value at the associated additional storage location whenever a word is written into a storage location of the main store, means for writing the other value of the binary digit into the additional storage location when the contents of the associated storage location in the main store are read, and means for generating a warning signal when an attempt is made to overwrite the contents of a storage location in the main store when the binary digit in the associated additional storage is of the said one value.

Preferably means are also provided for generating a warning signal at the end of a program when the binary digit stored at any of the additional storage locations is of said one value.

In carrying out the invention the warning signal may be arranged to function as an interrupt signal.

It may also be convenient to provide means for inhibiting the generation of warning signals in specific circumstances and for writing explicitly either binary value into particular additional storage locations.

In order that the invention may be more fully understood reference will now be made to the accompanying drawing the single FIGURE of which illustrates an embodiment of the invention in block diagrammatic form.

The diagram shows a store 1 which is an auxiliary or additional store to the main store of a computer. Store 1 has a number of locations equal to the size of the main store. Thus if the main store has 32K addresses then store 1 also has 32K addresses. Each location in store 1 can store 1 bit so that store 1 is a 32K 1 bit store.

Address selection means 2 is provided for store 1 and is operated by addressing data provided from the main computer busbar 3 or from its own address register 4.

Various initial and terminating functions of the arrangement are controlled by a control logic circuit 5 which controls address register 4 and a counter register 6.

Data can be written into store 1 along a read-write (R/W) line 7 or from the control logic 5. The timing of the writing and reading of data into and from store 1 is controlled by enabling pulses along a line 8 fed either from bus 3 or from control logic 5. Data read out from store 1 is fed to AND gate 9 which is also supplied with pulses from R/W line 7. Output of AND gate 9 is fed to a further AND gate 10 together with pulses from line 8 after passing through an inverter 11. The output of AND gate 10 is applied to a flip-flop circuit 12 which supplies an interrupt circuit. Flip-flop 12 can be cleared from control 5.

In operation of the circuit store 1 is initially set up so that either the whole of the store or a block thereof is set to "0". This is done by control 5. The first address of the block, or the lowest address of the store, is initially set in address register 4 from the computer bus 3.

The length of the block, or the total length of the store, is set in count register 6 and control 5 functions to increment address register 4 while decrementing count register 6 until register 6 reaches 0. At each incrementation address register 4 sets address selection means 2 to the address corresponding to the contents of register 4 and a "0" pulse is fed from control 5 along line 13 to the "data in" terminal of store 1. At the same time an enabling pulse is fed from control 5 along line 8 to store 1.

A feature of the system is that writing into store 1 does not take place until receipt of the trailing edge of the enabling pulse and not at its loading edge so that writing only takes place at the end of an enabling edge.

During initial setting up flip-flop 12 is disabled. Having set up store 1 the arrangement is now available for a monitoring program activity.

During the running of a program address selection means 2 is coupled along busbar 3 to the address selection means of the main store so that any writing into or reading from an address in the main store causes the corresponding address in store 1 to be selected. Should the operation in the main store be a writing operation then a high level pulse is sent along R/W line 7 which causes a "1" to be fed into the selected address of store 1 as timed by an enabling pulse applied along line 8. For a reading operation in the main store R/W line is at a low level thus providing a "0" for writing into store 1. However, as described above writing takes place only at the trailing edge of the enabling pulse and not at its leading edge. The leading edge of the enabling pulse controls reading from store 1 so that before a digit is written into a selected address in store 1 the digit previously stored at that address is read out.

The digit read out from store 1 is compared with the digit about to be written into store 1 and which is present on line 7. This comparison takes place in AND gate 9. Given that a read operation is represented by "0" and a write operation is represented by a "1" a truth table for AND gate 9 can be drawn up as follows:

| PREVIOUS | PRESENT | OUTPUT |
| --- | --- | --- |
| 0 | 0 | 0 |
| 0 | 1 | 0 |
| 1 | 0 | 0 |
| 1 | 1 | 1 |

In the final column a 1 indicates an output from AND gate 9 and it will be seen that the only condition in which an output occurs is if both the previous and present signals are "1"s indicating that an attempt was made to write to the main store after a previous writing step without any intermediate reading step.

The output from AND gate 9 is fed to a further AND gate 10 which is also supplied with an inverted form of the enabling pulse. An output from AND gate 10 will thus be positive going in synchronism with the leading edge of the enabling pulse and exists subject to the conditions of the truth table. A positive going pulse from AND gate 10 to flip-flop 12 provides an interrupt signal. The interrupt signal may provide a warning or may be used to physically interrupt the operation of the program.

At the end of a program all of the assignments to the main store should have been read and if not then there will have been superfluous assignments. Store 1 can be used to check for this condition by use of control logic 5 to step through the addresses of store 1. Either the entire store can be stepped through or else only a selected block by use of address register 4 and counter register 6. Control logic 5 provides a high level or "1" pulse on line 13 and an enabling pulse along line 14. If a "1" is already contained in store 1 at any of the locations addressed then an interrupt signal will be generated when that location is reached in the same manner as described above in connection with program running. The location of the error will be contained in address register 4.

We claim:

1. A computer storage arrangement including a plurality of numerically addressed storage locations additional to the storage locations of a main store and each associated with a corresponding storage location in the main store, said additional storage locations each being arranged to store at least a single binary digit, means for writing a binary digit of one value at the associated additional storage location whenever a word is written into a storage location of the main store, means for writing the other value of the binary digit into the additional storage location when the contents of the associated storage location in the main store are read, and means for generating a warning signal when an attempt is made to overwrite the contents of a storage location in the main store when the binary digit in the associated additional storage is of the said one value.

2. The arrangement as claimed in claim 1 in which the means for generating a warning signal includes means for determining whether the contents of a location in the additional store associated with a location in the main store at which a writing operation is taking place is of said one value.

3. The arrangement as claimed in claim 2 in which the means for writing to said additional store includes means for reading the contents of a selected location before writing to such selected location.

4. The arrangement in claim 2 which the said determining means comprises comparison means for comparing the digital value about to be written into the said location in the additional store with the digital value read from the said location and for generating a warning signal only when both digits are of said one value.

5. The arrangement as claimed in claim 4 in which said comparison means comprises an AND gate and said one value comprises a digital "1" and in which a warning signal is generated only when the output of the AND gate is "1".

6. The arrangement as claimed in claim 1 in which means are also provided for generating a warning signal at the end of a program when the binary digit stored at any of a group of selected additional storage locations is of said one value.

7. The arrangement as claimed in claim 1 in which the warning signal functions to interrupt a program.

* * * * *